No. 718,168. PATENTED JAN. 13, 1903.
A. H. STEMME.
COLLAR OR CUFF BUTTON.
APPLICATION FILED JULY 27, 1901.
NO MODEL.

WITNESSES:

INVENTOR
Alwin H. Stemme,
BY
his ATTORNEY.

THE NORRIS PETERS CO., PHOTO-LITHO., WASHINGTON, D. C.

UNITED STATES PATENT OFFICE.

ALWIN H. STEMME, OF NEW HAVEN, CONNECTICUT, ASSIGNOR TO HIMSELF AND JOHN FURGESON, OF NEW HAVEN, CONNECTICUT.

COLLAR OR CUFF BUTTON.

SPECIFICATION forming part of Letters Patent No. 718,168, dated January 13, 1903.

Application filed July 27, 1901. Serial No. 69,961. (No model.)

*To all whom it may concern:*

Be it known that I, ALWIN H. STEMME, a citizen of the United States, residing at New Haven, in the county of New Haven and State of Connecticut, have invented certain new and useful Improvements in Collar or Cuff Buttons, of which the following is a specification.

This invention relates to collar and cuff buttons; and its object is to provide a device of this character of simple construction which may be readily inserted into a buttonhole and quickly adjusted to secure it in position or to detach it from a collar or cuff.

The device comprises a two-part spring-shank, a head secured to the inner end thereof, and pivotally-secured prongs of novel construction at the outer end of the shank.

The construction of the improvement will be fully described hereinafter in connection with the accompanying drawings, which form part of the specification, and its novel features will be particularly pointed out in the appended claim.

Figure 1:
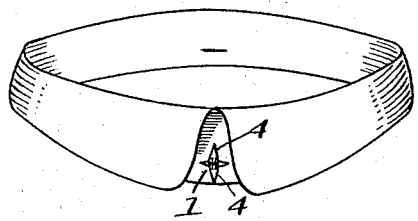
Figure 2:
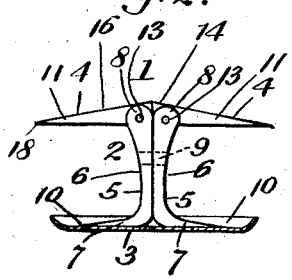
Figure 3:
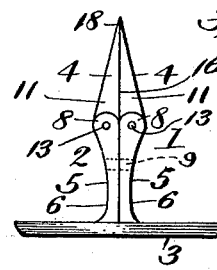
Figure 4:
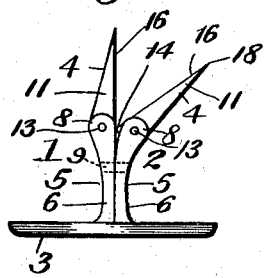
Figure 5:
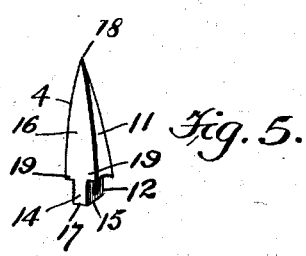
Figure 6:
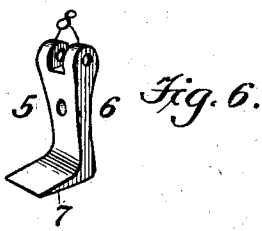

In the drawings, Figure 1 is a view in perspective of a collar with my improvement applied thereto. Fig. 2 is a side elevation, partly in section, of the button as it appears when in operative position. Fig. 3 is a side elevation showing the prongs of the device folded together ready for insertion into a buttonhole. Fig. 4 is a similar view showing one of the prongs turned outward. Fig. 5 is a view in perspective of one of the prongs detached, and Fig. 6 is a view in perspective of one member of the two-part shank.

The reference-numeral 1 designates the button, comprising a shank 2, a head 3, and prongs 4. The shank consists of two spring members 5, each comprising a body portion 6 and a laterally-projecting lip 7, secured permanently at 10 to the head 3. Intermediate their ends the shank members 5 are connected by a pin 9. Each of the shank members is bifurcated at its inner end to form parallel ears 8, said ears being perforated, as shown.

Each of the prongs 11 is recessed at its larger end or base to form a lug 12, having a perforation to receive a pivot-pin 13, said pins also extending through the perforations of the ears 8. The prongs are of tapering form on their outer surfaces, terminating in points 18, while their inner meeting faces 14 and 16 are plane, as shown, to adapt them to fit closely together. The end 15 of each of the lugs 12 is slightly beveled or inclined from the point 17. The recessing of the ends of the prongs provides laterally-projecting shoulders 19, which are hollowed out to fit the rounded inner ends of the shank members. The free ends of the prongs are reduced to a point 18, and it is obvious that when the two prongs are brought together, as shown in Fig. 3, a tapered wedge-shaped member is formed, which may be readily inserted through a buttonhole.

A characteristic feature of the improvement is the beveled surface 15 of each of the prongs, as this construction insures a secure locking of the two prongs when they are turned to the position shown in Fig. 2 against the spring tension of the shank members.

The utility and mode of operation of the device will be apparent from the illustration in the drawings. When the prongs are brought together, as shown in Fig. 3, they are ready to be inserted into a buttonhole, after which the separation of the prongs under the tension of the resilient shank members causes the two beveled faces 15 to abut. The prongs are maintained in the position shown in Fig. 2 under the spring tension until forcibly brought together when it is desired to detach the button.

The hollowed-out wings 19 of the shank not only insure a neat fit of the parts, but also serve to guide the prongs in their pivotal movement.

Having thus described my invention, I claim and desire to secure by Letters Patent—

A collar-button comprising a head, a shank consisting of two resilient rounded members, secured at one end to the head, and bifurcated at its opposite end to form ears, and a prong for each of said shank members formed with a lug pivotally secured between said ears, and laterally-extending wings hollowed out to conform to the contour of the rounded ends of the shank members, the meeting faces of said lugs being inclined, and the outer sides of the prongs being oppositely beveled to present a sharpened point when said prongs are brought together.

In testimony whereof I have signed my name in the presence of the subscribing witnesses.

ALWIN H. STEMME.

Witnesses:
WILLIAM MAYNARD,
WARREN H. BRISTOL.